(12) United States Patent
Abe

(10) Patent No.: US 10,330,908 B2
(45) Date of Patent: Jun. 25, 2019

(54) IMMERSION OBJECTIVE

(71) Applicant: OLYMPUS CORPORATION, Hachioji-shi, Tokyo (JP)

(72) Inventor: Kenichiro Abe, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 135 days.

(21) Appl. No.: 15/449,138

(22) Filed: Mar. 3, 2017

(65) Prior Publication Data

US 2017/0261736 A1 Sep. 14, 2017

(30) Foreign Application Priority Data

Mar. 8, 2016 (JP) ................. 2016-044825

(51) Int. Cl.
G02B 21/02 (2006.01)
G02B 21/33 (2006.01)
G02B 27/00 (2006.01)

(52) U.S. Cl.
CPC ............ *G02B 21/33* (2013.01); *G02B 21/02* (2013.01); *G02B 27/0025* (2013.01)

(58) Field of Classification Search
CPC .................................................. G02B 21/33
USPC ........................................................ 359/656
See application file for complete search history.

(56) References Cited

U.S. PATENT DOCUMENTS 9,195,040 B2 11/2015 Kasahara
9,477,073 B2 10/2016 Kasahara 2012/0113524 A1* 5/2012 Kasahara ............... G02B 21/33
359/656
2014/0320975 A1 10/2014 Kasahara
2015/0109681 A1 4/2015 Konishi

FOREIGN PATENT DOCUMENTS

| JP | 2001091849 A | 4/2001 |
| JP | 2014225001 A | 12/2014 |
| JP | 2015079144 A | 4/2015 |
| JP | 2015079222 A | 4/2015 |

OTHER PUBLICATIONS

Japanese Office Action (and English language translation thereof) dated Mar. 26, 2019 issued in counterpart Japanese Application No. 2016-044825.

* cited by examiner

*Primary Examiner* — James C. Jones
(74) *Attorney, Agent, or Firm* — Holtz, Holtz & Volek PC

(57) ABSTRACT

An immersion objective includes a first lens group, with a positive refractive power, that converts divergent light from an object point into convergent light and a second lens group, with a negative refractive power, that is arranged closer to the image than is the first lens group. The immersion objective satisfies the conditional expression below where WD is a working distance of the immersion objective and D is a distance on an optical axis of the immersion objective from the observation target plane to the lens surface closest to the image in the immersion objective.

$$0.11 \leq WD/D \leq 0.7$$

20 Claims, 10 Drawing Sheets

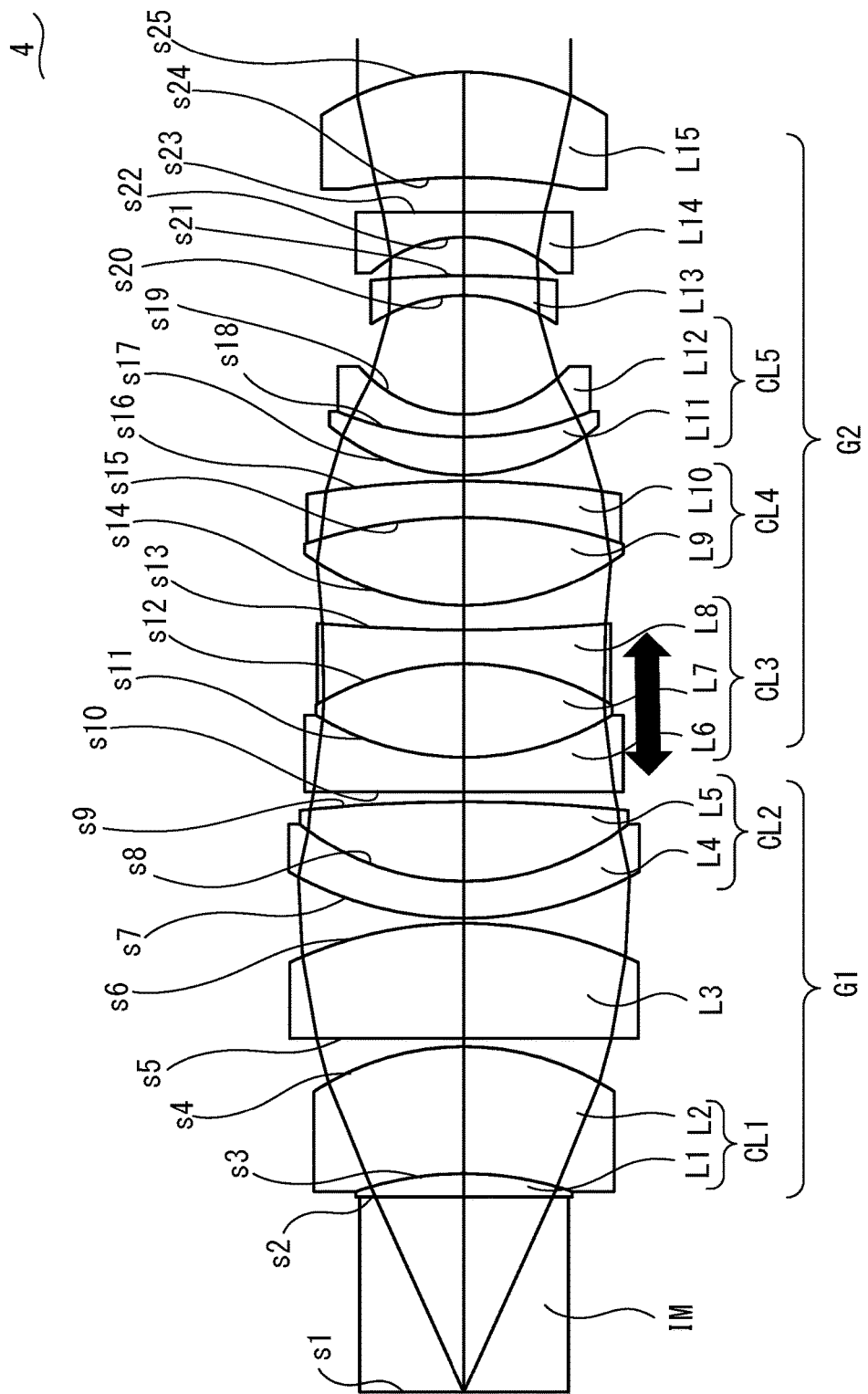
F I G. 7

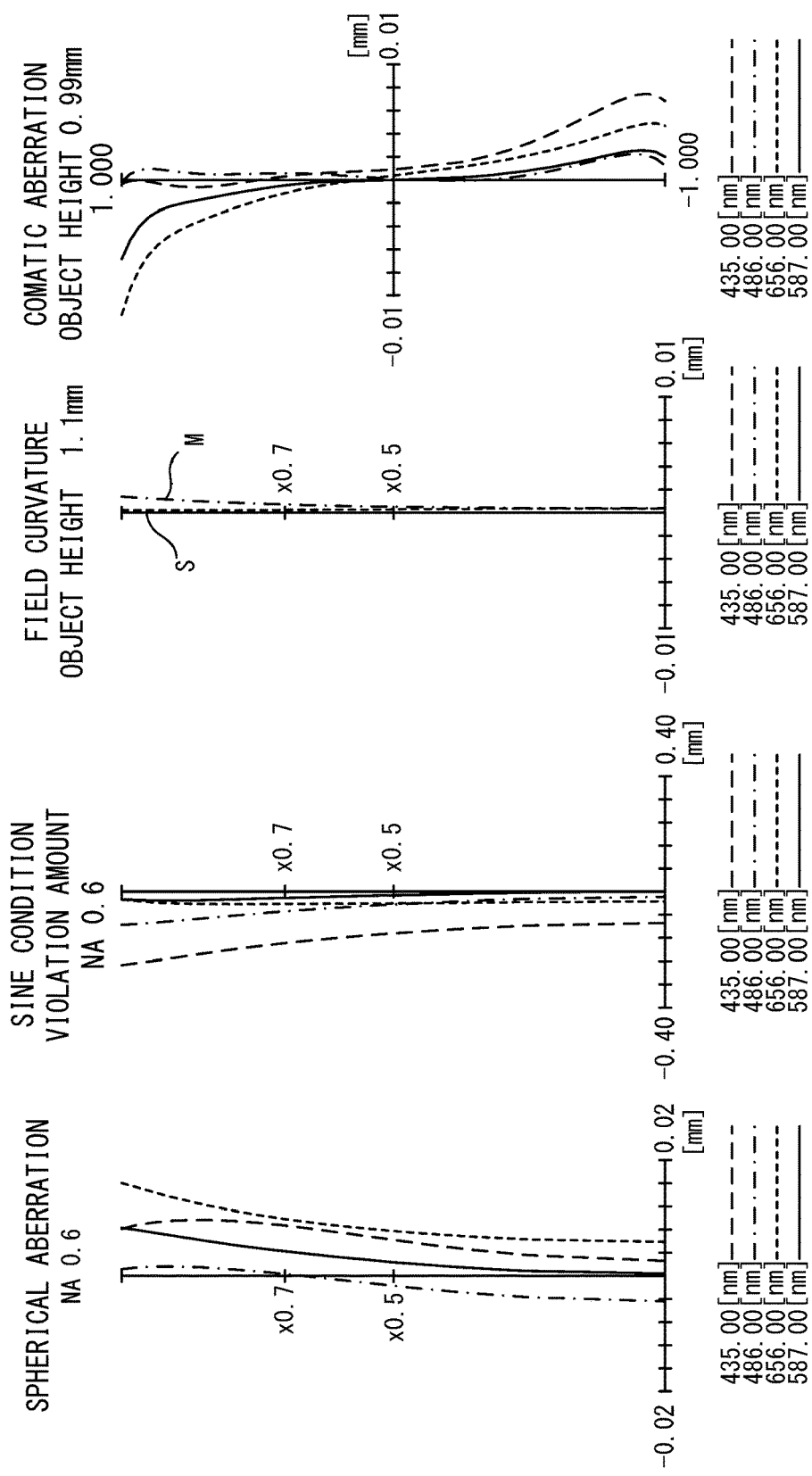

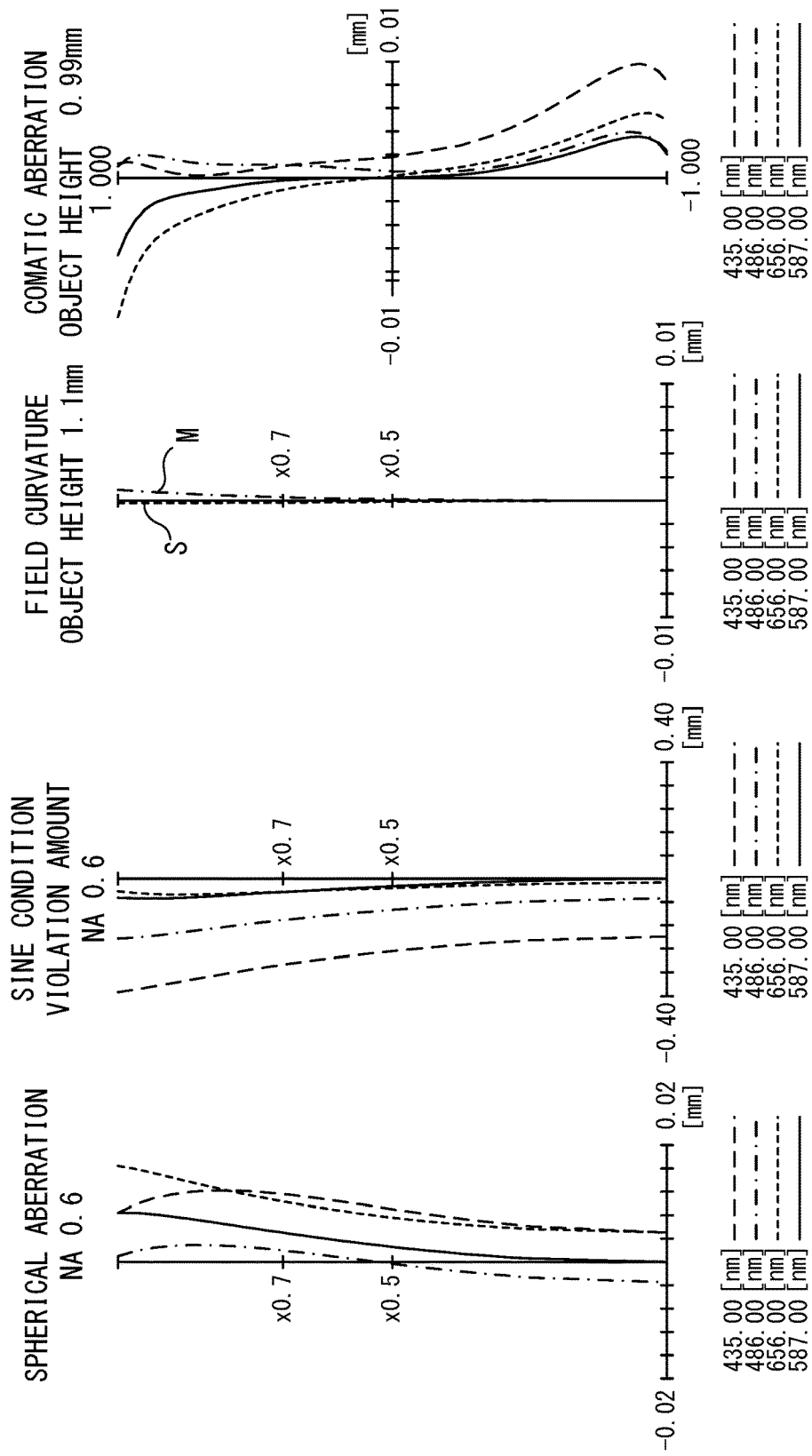

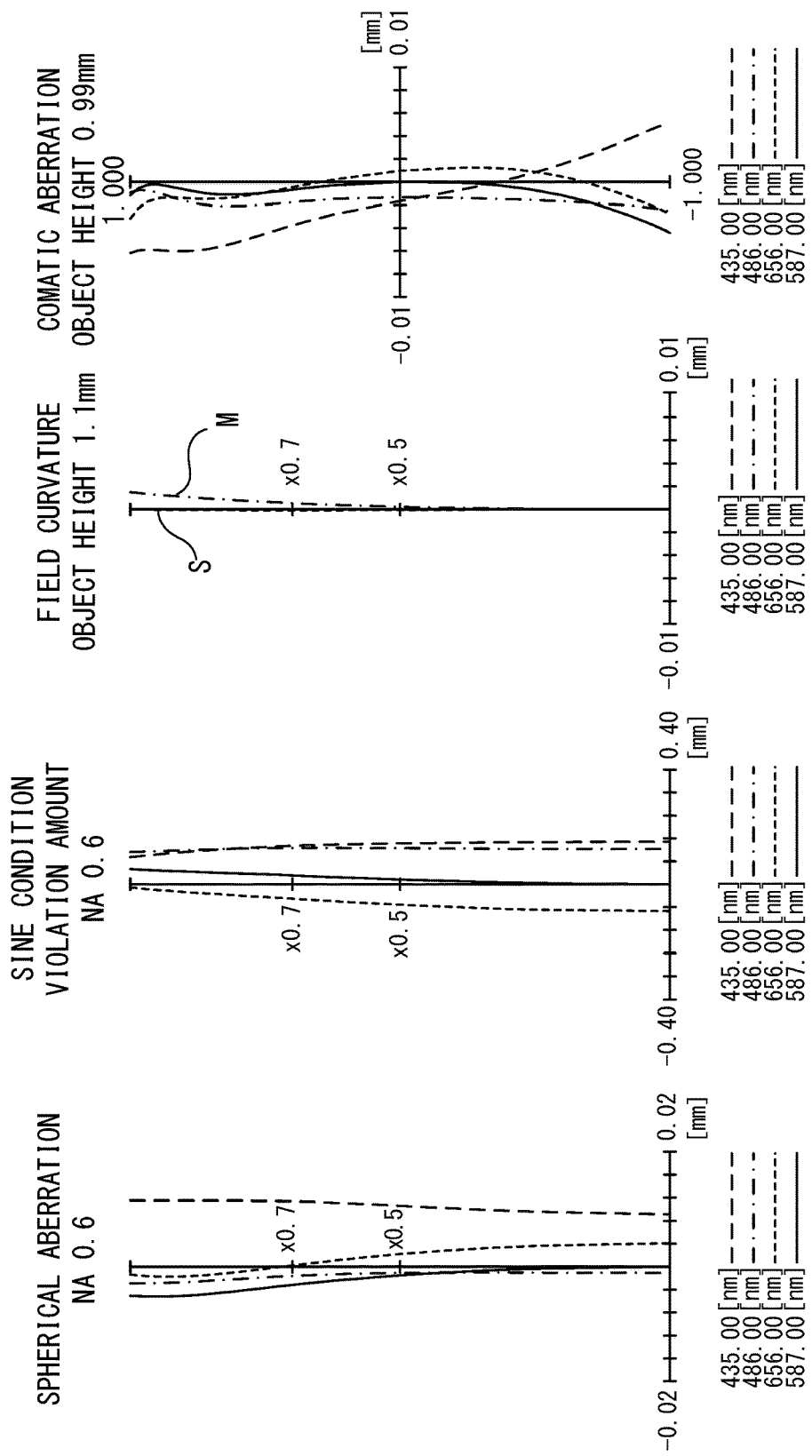

IMMERSION OBJECTIVE

CROSS REFERENCE TO RELATED APPLICATIONS

This application is based upon and claims the benefit of priority from prior Japanese Patent Application No. 2016-044825, filed Mar. 8, 2016, the entire contents of which are incorporated herein by this reference.

BACKGROUND OF THE INVENTION

Field of the Invention

The present invention is related to an immersion objective for a microscope optical system.

Description of the Related Art

In recent years, techniques of observing deep portions of a sample have developed remarkably in the field of microscopy, making it possible to entirely observe the inside of ever-larger samples. This has made it necessary for microscope optical systems to have immersion objectives with an ever-longer working distance and an excellent aberration performance over a wide field of view.

Immersion objectives with a wide field of view and a long working distance in conventional techniques are described in for example Japanese Laid-open Patent Publication No. 2015-079222 and Japanese Laid-open Patent Publication No. 2015-079144.

SUMMARY OF THE INVENTION

An aspect of the present invention provides an immersion objective including a first lens group, with a positive refractive power, that converts divergent light from an object point into convergent light, and a second lens group, with a negative refractive power, that is arranged closer to an image than is the first lens group, in which the immersion objective satisfies the conditional expression below, where WD is a working distance of the immersion objective and D is a distance on an optical axis of the immersion objective from an observation target plane to a lens surface closest to the image in the immersion objective.

$$0.11 \leq WD/D \leq 0.7 \quad (1)$$

BRIEF DESCRIPTION OF THE DRAWINGS

The present invention will be more apparent from the following detailed description when the accompanying drawings are referenced.

FIG. 7 is a sectional view of a microscope objective 4 according to example 4;

FIG. 8A through FIG. 8D are aberration diagrams of the microscope objective 4 in a first state;

FIG. 9A through FIG. 9D are aberration diagrams of the microscope objective 4 in a second state; and FIG. 10A through FIG. 10D are aberration diagrams of the microscope objective 4 in a third state.

DESCRIPTION OF THE EMBODIMENTS

Figure 1:
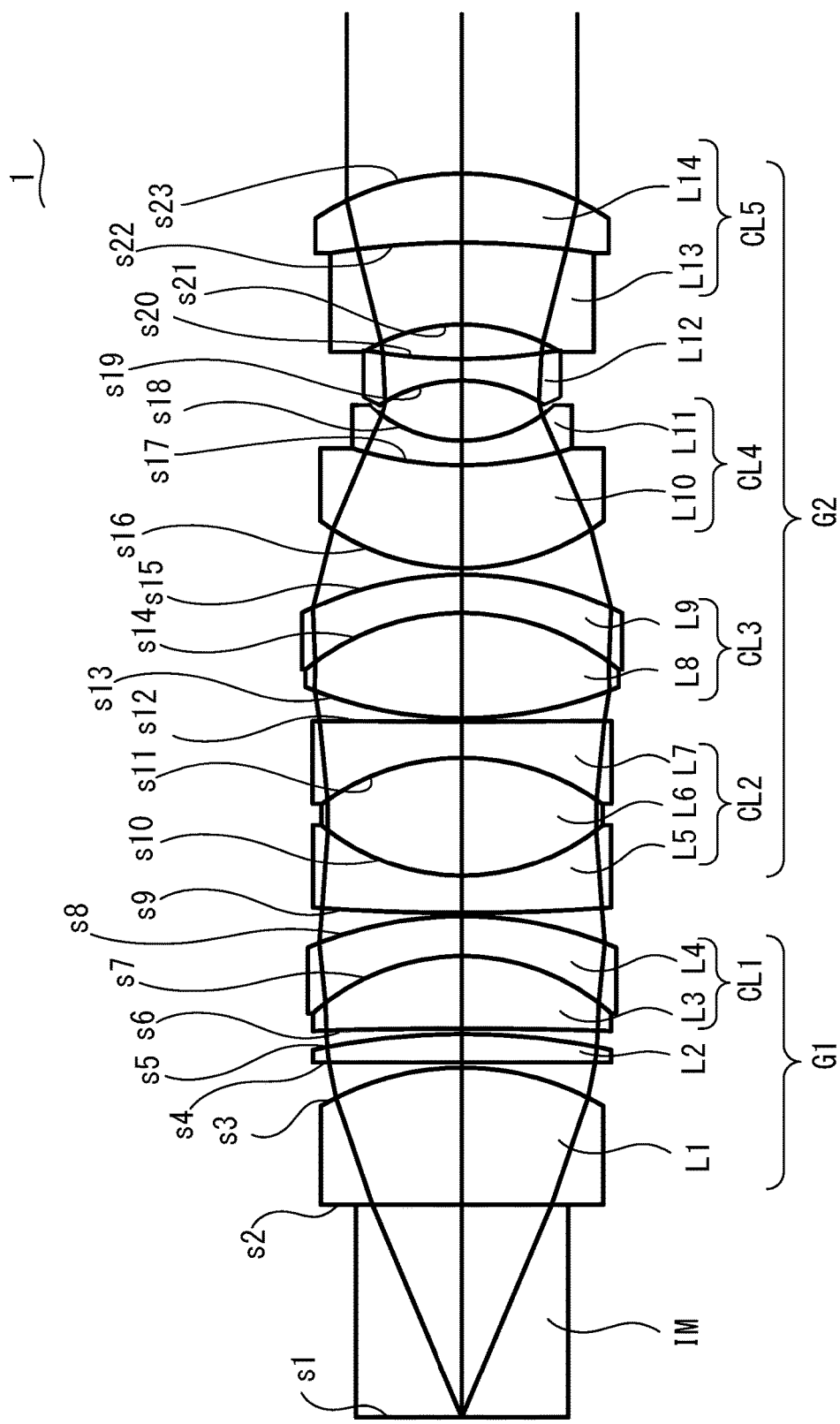
FIG. 1 is a sectional view of a microscope objective 1 according to example 1.

Incidentally, the immersion objectives disclosed in Japanese Laid-open Patent Publication No. 2015-079222 and Japanese Laid-open Patent Publication No. 2015-079144 have overall lengths that are relatively great with respect to the working distances. Thus, using the conventional techniques for making the working distance still longer results in an excessively large size of objectives. This makes it difficult to keep microscope optical systems in a prescribed size.

Also, the immersion objectives disclosed in Japanese Laid-open Patent Publication No. 2015-079222 and Japanese Laid-open Patent Publication No. 2015-079144 do not provide sufficient correction of off-axis aberrations such as comatic aberrations, field curvature, etc. for a case when ever-larger samples are to be observed.

Explanations will be given for a microscope objective according to an embodiment of the present invention. A microscope objective according to the present embodiment (which will be referred to simply as a microscope objective hereinafter) is an infinity-corrected immersion objective that is used in combination with a tube lens. A microscope objective, which is an immersion objective, is configured to achieve an excellent performance with the space between the sample and the objective filled with an immersion liquid. This makes it possible to reduce aberration variations, which depend upon the depth from the sample surface (object plane) to the observation target plane (which will be referred to as an observation depth hereinafter). Note that an immersion liquid is a medium having a refractive index close to that of the inside of the sample, and water, oil etc. for example are used for it.

The microscope objective includes a first lens group having a positive refractive power and a second lens group arranged closer to the image than is the first lens group and having a negative refractive power. The lens component closest to the image in the first lens group is the lens component closest to the object for converting a divergent pencil of rays from an object point into a convergent pencil of rays so as to emit that convergent pencil of rays. In other words, when there are a plurality of lens surfaces emitting a convergent pencil of rays in the microscope objective, the lens surface closest to the object from among those lens surfaces is the lens surface closest to the image in the first lens group. The boundary between the first and second lens groups can be identified by the above characteristics.

Note that a pencil of rays (or a pencil of light) in this specification is a bundle of rays emitted from one point of an object (object point). Note also that a "lens component" described herein refers to one lens block, regardless of whether it is a single lens or a cemented lens. The lens block has lens surfaces which transmit rays, only two surfaces from among the lens surfaces contact air (or immersion liquid) on the object side and the image side.

The first lens group converts a divergent pencil of rays from an object point into a convergent pencil of rays so as to make it enter the second lens group. The second lens group converts a convergent pencil of rays from the first lens group into a parallel pencil of rays. The first lens group once converts a divergent pencil of rays from an object point into a convergent pencil of rays in the first lens group and thereafter makes it enter the second lens group, making it possible to make the marginal ray height smaller in the second lens group than in the first lens group. This makes it possible to effectively correct the Petzval sum in the second lens group having a negative refractive power. As a result of this, it is possible to excellently correct field curvature over a wide field of view.

This configuration is advantageous particularly for immersion objectives. This is because while dry objectives can correct field curvature on the first lens surface located closest to the object and having a concave surface shape, it is difficult for immersion objectives having a small difference between a refractive index of the immersion liquid and a refractive index of the lens to perform sufficient correction on the first lens surface.

The microscope objective is further configured to satisfy the conditional expression below.

$$0.11 \leq WD/D \leq 0.7 \qquad (1)$$

WD is the working distance of the microscope objective. D is the distance on the optical axis from the observation target plane to the lens surface closest to the image in the microscope objective. D is also the distance on the optical axis from the sample surface to the lens surface closest to the image in the microscope objective when the front focal position of the microscope objective is adjusted to the sample surface. Note that an observation target plane is a plane orthogonal to an optical axis that passes through the focal position at which an infinite light flux parallel to the optical axis is condensed when that infinite light flux enters from the image side of the microscope objective. Also, a working distance is a distance from the sample surface to the lens surface closest to the object in the microscope objective when the front focal position of the microscope objective is adjusted to the sample surface. In other words, above D is equal to the sum of the overall length of the microscope objective (distance on the optical axis from the lens surface closest to the object to the lens surface closest to the image in the microscope objective) and the working distance.

A value not smaller than the lower limit value of conditional expression (1) makes it possible to extend the working distance with respect to the overall length of the microscope objective. This makes it possible to perform observation of a portion of a prescribed depth without causing a situation in which the microscope objective becomes larger so as to reduce the space for the experimental system (such as a microscope system). Also, a value not greater than the upper limit value of conditional expression (1) makes it possible to secure a sufficient area to be occupied by lens groups, particularly the first lens group, that constitute the microscope objective. This makes it possible for the first lens group to convert a pencil of rays into a convergent pencil of rays while moderately refracting the rays. This makes it possible to excellently correct various aberrations, particularly comatic aberrations.

The microscope objective having the above configuration can realize a long working distance while suppressing the overall length of the microscope objective. This makes it possible for the microscope objective to realize a working distance longer than those realized by the conventional techniques while adapting to an experimental system of a prescribed size. Also, the microscope objective can realize high performance regarding off-axis aberration performance such as comatic aberrations, field curvature, etc. Thus, according to the microscope objective of the present embodiment, it is possible to realize an immersion objective having a long working distance and excellent aberration performance over a wide field of view.

Note that the microscope objective may be configured to satisfy conditional expression (1-1) or (1-2) below instead of conditional expression (1).

$$0.12 \leq WD/D \leq 0.5 \qquad (1\text{-}1)$$

$$0.13 \leq WD/D \leq 0.3 \qquad (1\text{-}2)$$

Hereinafter, explanations will be given for a configuration that is further desirable for the microscope objective.

It is desirable that the first lens group include a plano-convex lens component having a plano-convex shape and having the planar surface on the object side. It is desirable that the plano-convex lens component be a front-end lens component arranged closest to the object in the first lens group. Employing a planar surface for the surface on the object side (first lens surface) in the front-end lens component, which is the boundary plane with the immersion liquid, makes it possible to avoid the generation of bubbles that are apt to be generated easily in the case of a concave surface. Also, planar surfaces make cleaning easier. Thus, it is advantageous also in view of cleaning. Further, employing a convex surface for the surface on the image side in the front-end lens component makes it possible to convert a divergent pencil of rays from an object point into a divergent pencil of rays having a smaller angle in the front-end lens component. This makes it possible to suppress occurrence of aberrations such as spherical aberrations, comatic aberrations, etc. in the optical system that is closer to the image than is the front-end lens component.

It is desirable that the second lens group include a first meniscus lens component having the concave surface on the image side and a second meniscus lens component arranged closer to the image side than is that first meniscus lens component and having the concave surface on the object side. The first and second meniscus lens components are arranged so that their respective concave surfaces face each other, and thereby constitute a so-called gauss lens group. A gauss lens group has a function of effectively correcting a Petzval sum. This makes it possible for the microscope objective to correct field curvature further excellently.

Note that when the second lens group has a plurality of meniscus lens components having the concave surfaces on the image side, the above first meniscus lens component is the meniscus lens component closest to the image from among them. Also, when the second lens group has a plurality of meniscus lens components having the concave surfaces on the object side, the above second meniscus lens component is the meniscus lens component closest to the image from among them.

It is desirable that that the second lens group further include a third lens component arranged between the first and second meniscus lens components and having a negative refractive power. A marginal ray has a relatively small height between the first and second meniscus lens components. Arranging a third lens component having a negative refractive power in an area with this small ray height makes it possible to correct field curvature more effectively. Also, the gauss lens group and the third lens component bear the role of correcting field curvature (i.e., the third lens component bears part of the role of correcting field curvature). This reduces loads on the first meniscus lens component constituting the gauss lens group. This makes it possible to better adjust the balance between a comatic aberration and an astigmatism in the first meniscus lens component in which the correction of a comatic aberration and the occurrence of an astigmatism is in a trade-off relationship. This makes it possible to correct off-axis aberrations such as field curvature, an astigmatism and a comatic aberration more excellently and comprehensively.

Note that when a plurality of lens components having a negative refractive power exist between the first and second meniscus lens components, the above third lens component is the component having the smallest thickness on the optical axis from among them.

It is desirable that the microscope objective include a movable lens that moves along the optical axis. A movement of the movable lens component in the optical axis directions changes the height of a marginal ray entering the movable lens component and a lens component closer to the image than is the movable lens component. This makes it possible to compensate for variations in aberrations mainly such as a spherical aberration etc. that is caused by a change in the refractive index of the immersion liquid by moving the movable lens component in accordance with the refractive index of the immersion liquid.

Also, it is desirable that the movable lens component has a negative refractive power. Taking the role of the movable lens component compensating for variations of a spherical aberration into consideration, the movable lens component is arranged in an area in which the marginal ray height is relatively great. In an area in which the marginal ray height is relatively great, the achromatism effect by a lens having a negative refractive power is high. Thus, the movable lens component having a negative refractive power can correct an on-axis chromatic aberration excellently. Further, it is desirable that the movable lens be a cemented lens because it makes it possible to correct a greater on-axis chromatic aberration.

Also, it is desirable that the microscope objective be further configured to satisfy the conditional expressions below.

$$0.7 \leq D_{G2}/WD \leq 5 \quad (2)$$

$$0.46 \leq D_{GL}/f \leq 3 \quad (3)$$

$$2 \leq D_{GL}/D_{GM} \leq 40 \quad (4)$$

$$-0.15 \leq D_{GM}/f_{GM} \leq -0.01 \quad (5)$$

$$0.3 \leq f_{U1}/WD \leq 4 \quad (6)$$

In the above, $D_{G2}$ is the distance on the optical axis from the lens surface closest to the object in the second lens group to the lens surface closest to the image in the second lens group (which will be referred to as the overall length of the second lens group). $D_{GL}$ is the distance on the optical axis from the lens surface closest to the object in the second meniscus lens component to the lens surface closest to the image in the second meniscus lens component (which will be referred to as the thickness of the second meniscus lens component). f is the focal length of the immersion objective. $D_{GM}$ is the distance on the optical axis from the lens surface closest to the object in the third lens component to the lens surface closest to the image in the third lens component (which will be referred to as the thickness of the third lens component). $f_{GM}$ is the focal length of the third lens component. $f_{U1}$ is the focal length of the front-end lens component.

A value not smaller than the lower limit value of conditional expression (2) prevents the area occupied by the second lens group from becoming too small with respect to a prescribed working distance. This makes it possible to secure a large correction amount of the Petzval sum in the second lens group. This makes it possible correct field curvature in the microscope objective excellently. Also, a value not greater than the upper limit value of conditional expression (2) prevents the area occupied by the second lens group from becoming too large. This makes it possible to secure a sufficient area to be occupied by the first lens group. This makes it possible for the first lens group to convert a pencil of rays into a convergent pencil of rays while moderately refracting the rays, making it possible to excellently correct various aberrations such as a comatic aberration etc. particularly. Accordingly, satisfying conditional expression (2) makes it possible to further excellently correct off-axis aberrations such as field curvature and a comatic aberration while realizing a prescribed working distance.

It is further desirable that the microscope objective satisfy conditional expression (2-1) or (2-2) below instead of conditional expression (2).

$$1.4 \leq D_{G2}/WD \leq 4.3 \quad (2-1)$$

$$2 \leq D_{G2}/WD \leq 3.7 \quad (2-2)$$

A value not smaller than the lower limit value of conditional expression (3) prevents the thickness of the second meniscus lens component from becoming too small. This makes it possible to make the marginal ray height sufficiently smaller on the concave surface of the second meniscus lens component than that on the convex surface of the second meniscus lens component. This makes it possible to correct the Petzval sum more effectively. Also, a value not greater than the upper limit value of conditional expression (3) prevents the thickness of the second meniscus lens component from becoming too great. This makes it possible to secure a sufficient area for other lens components. Thereby, it is possible to correct various aberrations excellently without making the microscope objective excessively large. Accordingly, satisfying conditional expression (3) makes it possible to correct particularly field curvature more excellently while preventing the microscope objective from becoming larger.

Note that it is further desirable that the microscope objective satisfy conditional expression (3-1) or (3-2) below instead of conditional expression (3).

$$0.54 \leq D_{GL}/f \leq 2 \quad (3-1)$$

$$0.58 \leq D_{GL}/f \leq 1.5 \quad (3-2)$$

A value not smaller than the lower limit value of conditional expression (4) can prevent the thickness of the second meniscus lens component from becoming too small and can make the marginal ray height sufficiently low in the third lens component and on the concave surface of the second meniscus lens component. This makes it possible to correct the Petzval sum more effectively. Also, a value not greater than the upper limit value of conditional expression (4) prevents the thickness of the second meniscus lens component from becoming too great with respect to the third lens component having a prescribed thickness. This makes it possible to secure a sufficient area for other lens components. Thereby, it is possible to correct various aberrations excellently without making the microscope objective excessively large. Accordingly, satisfying conditional expression (4) makes it possible to further excellently correct particularly field curvature while preventing the microscope objective from becoming larger.

Note that it is further desirable that the microscope objective satisfy conditional expression (4-1) or (4-2) below instead of conditional expression (4).

$$3 \leq D_{GL}/D_{GM} \leq 25 \quad (4-1)$$

$5 \leq D_{GL}/D_{GM} \leq 15$ (4-2)

A value not smaller than the lower limit value of conditional expression (5) prevents the thickness of the third meniscus lens component from becoming too great and prevents the absolute value of the focal length of the third lens component having a negative refractive power from becoming too small. This makes it possible to prevent the marginal ray height from becoming too great between the gauss lens groups (the first meniscus lens component and the second meniscus lens component). Thereby, it is possible to achieve a high field curvature correction effect in gauss lens groups. Also, a value not greater than the upper limit value of conditional expression (5) can prevent the absolute value of the negative focal length of the third lens component from becoming too great, while permitting the third lens component to have a prescribed thickness. Thereby, it is possible to make the third lens component fully provide the effect of correcting the Petzval sum. Accordingly, satisfying conditional expression (5) makes it possible to further excellently correct particularly field curvature.

It is further desirable that the microscope objective satisfy conditional expression (5-1) or (5-2) below instead of conditional expression (5).

$-0.14 \leq D_{GM}/f_{GM} \leq -0.01$ (5-1)

$-0.11 \leq D_{GM}/f_{GM} \leq -0.03$ (5-2)

A value not smaller than the lower limit value of conditional expression (6) prevents the focal length of front-end lens component from becoming too small and can reduce the occurrence amount of a spherical aberration and a comatic aberration to a small amount in the front-end lens component. Also, a value not greater than the upper limit value of conditional expression (6) can reduce the divergence angle of pencil of rays emitted from the front-end lens component to a small angle. This makes it possible to reduce the occurrence amount of a spherical aberration and a comatic aberration to a small amount in the optical system located closer to the image than is the front-end lens component. Accordingly, satisfying conditional expression (6) makes it possible to further excellently correct particularly a spherical aberration and a comatic aberration.

It is further desirable that the microscope objective satisfy conditional expression (6-1) or (6-2) below instead of conditional expression (6).

$0.5 \leq f_{U1}/WD \leq 3$ (6-1)

$1 \leq f_{U1}/WD \leq 2.5$ (6-2)

Hereinafter, explanations will be given for examples of the above microscope objective.

Example 1

FIG. 1 is a sectional view of a microscope objective 1 according to the present example. The microscope objective 1 is an immersion objective. The microscope objective 1 includes first lens group G1, with a positive refractive power, that converts divergent light from an object point into convergent light and second lens group G2, with a negative refractive power, that is arranged closer to the image than is first lens group G1. The space between the object plane and first lens group G1 is filled with immersion liquid IM.

First lens group G1 includes a plano-convex lens component (lens L1) having a plano-convex shape and having the planar surface on the object side. The plano-convex lens component is a front-end lens component arranged closest to the object in the first lens group G1.

In more detail, first lens group G1 includes, in order starting from the object side, plano-convex lens L1 (front-end lens component) having the planar surface on the object side, plano-convex lens L2 having the planar surface on the object side and cemented lens CL1 having a meniscus shape having the concave surface on the object side. Cemented lens CL1 includes meniscus lens L3 having the concave surface on the object side and meniscus lens L4 having the concave surface on the object side.

Second lens group G2 includes a first meniscus lens component (cemented lens CL4) having the concave surface on the image side and a second meniscus lens component (cemented lens CL5) arranged closer to the image than is the first meniscus lens component and having the concave surface on the object side. Second lens group G2 further includes a third lens component (lens L12), with a negative refractive power, that is arranged between the first and second meniscus lens components.

In more detail, second lens group G2 includes, in order starting from the object side, three-piece cemented lens CL2 having the concave surface on the image side and having a meniscus shape, cemented lens CL3 having a biconvex shape, cemented lens CL4 having the concave surface on the image side and having a meniscus shape, biconcave lens L12 and a cemented lens CL5 having the concave surface on the object side and having a meniscus shape. Three-piece cemented lens CL2 includes meniscus lens L5 having the concave surface on the image side, biconvex lens L6 and a biconcave lens L7. Cemented lens CL3 includes biconvex lens L8 and meniscus lens L9 having the concave surface on the object side. Cemented lens CL4 includes meniscus lens L10 having the concave surface on the image side and meniscus lens L11 having the concave surface on the image side. Cemented lens CL5 includes meniscus lens L13 having the concave surface on the object side and meniscus lens L14 having the concave surface on the object side.

The microscope objective 1 has lens data as below, with INF representing infinity (∞).

| Microscope objective 1 | | | | |
|---|---|---|---|---|
| s | r | d | nd | vd |
| 1 (object plane) | INF | 19.999 | 1.55003 | 49.50 |
| 2 | INF | 12.912 | 1.88306 | 40.76 |
| 3 | −26.0918 | 0.500 | | |
| 4 | INF | 2.654 | 1.75504 | 52.32 |
| 5 | −65.9654 | 0.500 | | |
| 6 | −433.3280 | 6.800 | 1.49702 | 81.54 |
| 7 | −20.9961 | 3.750 | 1.63779 | 42.41 |
| 8 | −36.9284 | 0.300 | | |
| 9 | 195.3339 | 3.500 | 1.63779 | 42.41 |
| 10 | 20.5768 | 11.109 | 1.43876 | 94.93 |
| 11 | −22.0851 | 3.400 | 1.63779 | 42.41 |
| 12 | 2466.6626 | 0.300 | | |
| 13 | 38.0970 | 9.876 | 1.49702 | 81.54 |
| 14 | −23.0178 | 3.650 | 1.63779 | 42.41 |
| 15 | −32.8164 | 0.625 | | |
| 16 | 22.1524 | 9.626 | 1.83486 | 42.73 |
| 17 | 33.8972 | 2.300 | 1.73806 | 32.26 |
| 18 | 12.9252 | 5.663 | | |
| 19 | −14.1712 | 2.000 | 1.49702 | 81.54 |
| 20 | 50.6036 | 3.305 | | |
| 21 | −17.7931 | 7.688 | 1.48751 | 70.23 |
| 22 | −76.7834 | 6.470 | 1.88306 | 40.76 |
| 23 | −24.5431 | | | |

In the above, s represents a surface number, r represents a curvature radius (mm), d represents an inter-surface distance (mm), nd represents a refractive index for a d ray, and vd represents an Abbe number. These symbols have similar meanings also in the other examples. The surfaces represented by surface numbers s1, s2 and s23 are respectively the object plane, the lens surface closest to the object in the microscope objective 1 and the lens surface closest to the image in the microscope objective 1. Abbe number vd1 represents a refractive index of immersion liquid IM. Also, inter-surface distance d1 for example represents a distance from the surface represented by surface number s1 to the surface represented by surface number s2 on the optical axis.

The microscope objective 1 has data as below, with NA representing the numerical aperture on the object side, Y representing the maximum object height, $f_{G1}$ representing the focal length of the first lens group and $f_{G2}$ representing the focal length of the second lens group. The other parameters are as described above.

NA=0.6, f=17.973 mm, WD=19.999 mm, Y=1.1 mm, $f_{G1}$=20.217 mm, $f_{G2}$=−161.128 mm, D=116.927 mm, $D_{G2}$=69.512 mm, $D_{GL}$=14.158 mm, $D_{GM}$=2 mm, $f_{GM}$=−22.049 mm, $f_{U1}$=29.547 mm

The microscope objective 1 satisfies conditional expressions (1) through (6) as described below.

$$WD/D = 0.171 \tag{1}$$

$$D_{G2}/WD = 3.476 \tag{2}$$

$$D_{GL}/f = 0.788 \tag{3}$$

$$D_{GL}/D_{GM} = 7.079 \tag{4}$$

$$D_{GM}/f_{GM} = -0.091 \tag{5}$$

$$f_{U1}/WD = 1.477 \tag{6}$$

Figures 2A, 2B, 2C, 2D:
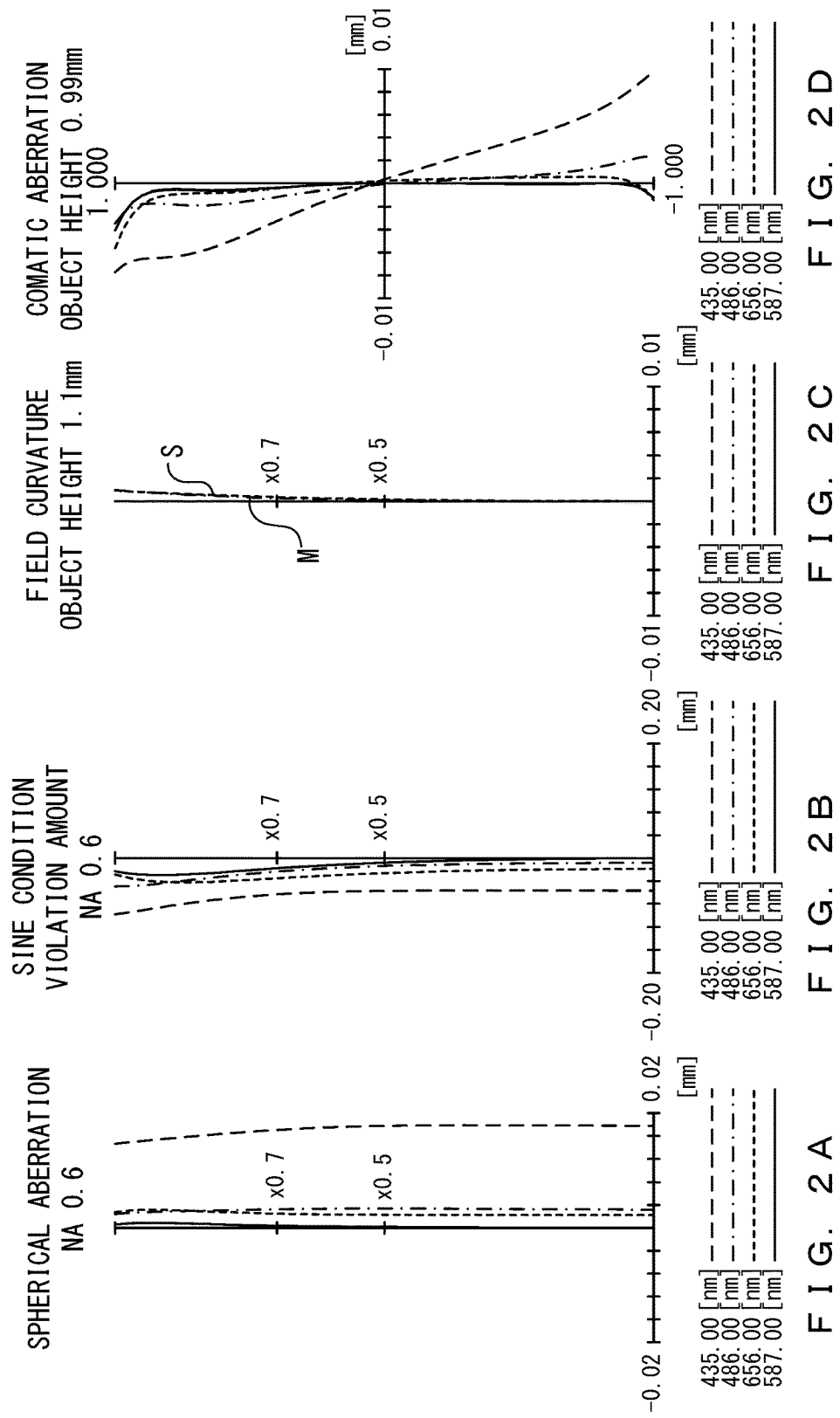
FIG. 2A through FIG. 2D are aberration diagrams of the microscope objective 1.

FIG. 2A through FIG. 2D are aberration diagrams of the microscope objective 1, showing aberrations on the object plane when an infinite light flux enters from the image side. FIG. 2A is a spherical aberration diagram. FIG. 2B shows sine condition violation amounts. FIG. 2C shows field curvature. FIG. 2D is a comatic aberration diagram at a position of 90% (0.99 mm) of object height Y. In the diagrams, "M" and "S" represent a meridional component and a sagittal component, respectively. These symbols have similar meanings also in the examples below. As shown in FIG. 2A through FIG. 2D, in the microscope objective 1, aberrations are corrected excellently over a wide field of view and high imaging performance is realized.

Example 2

Figure 3:
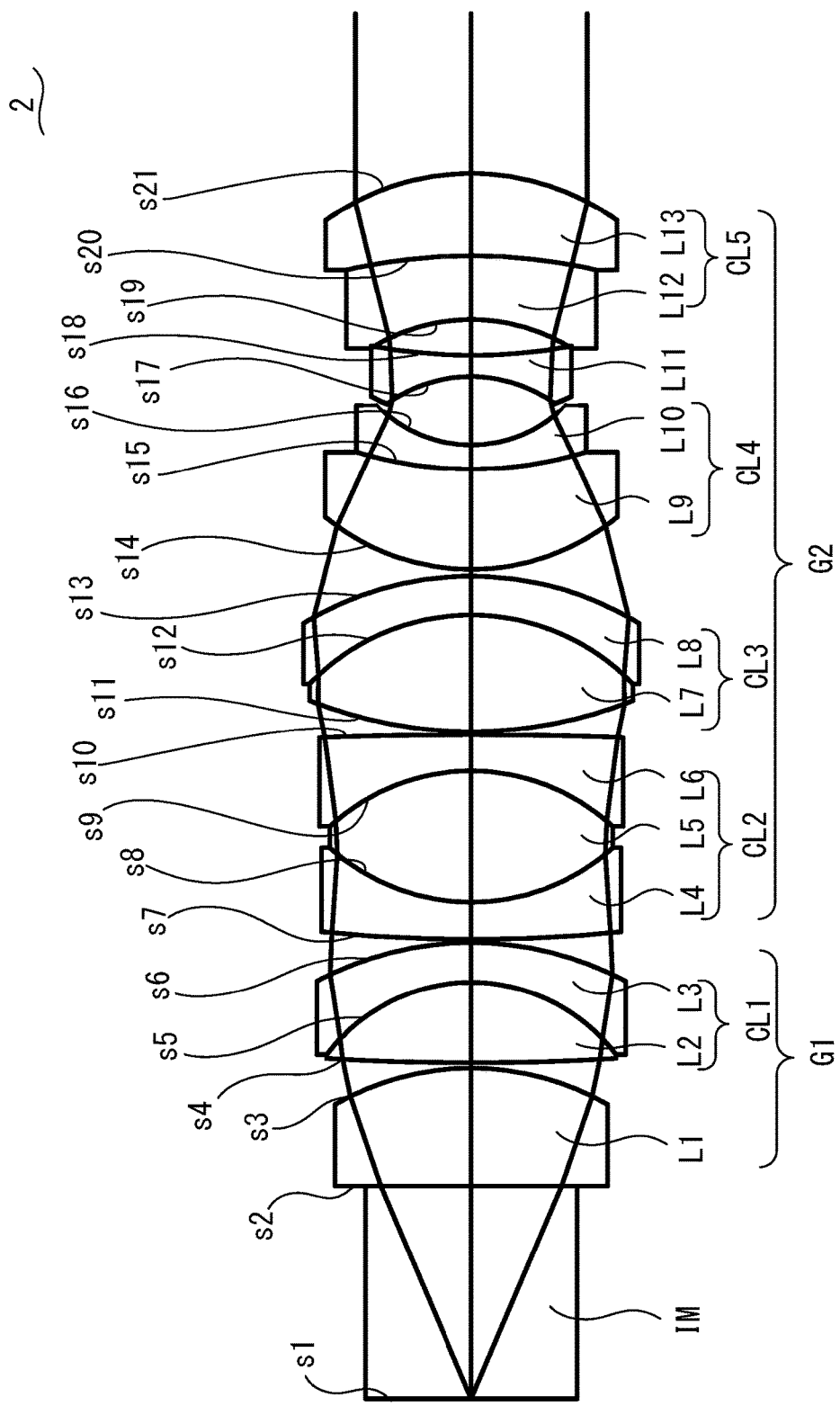
FIG. 3 is a sectional view of a microscope objective 2 according to example 2.
Figure 4:
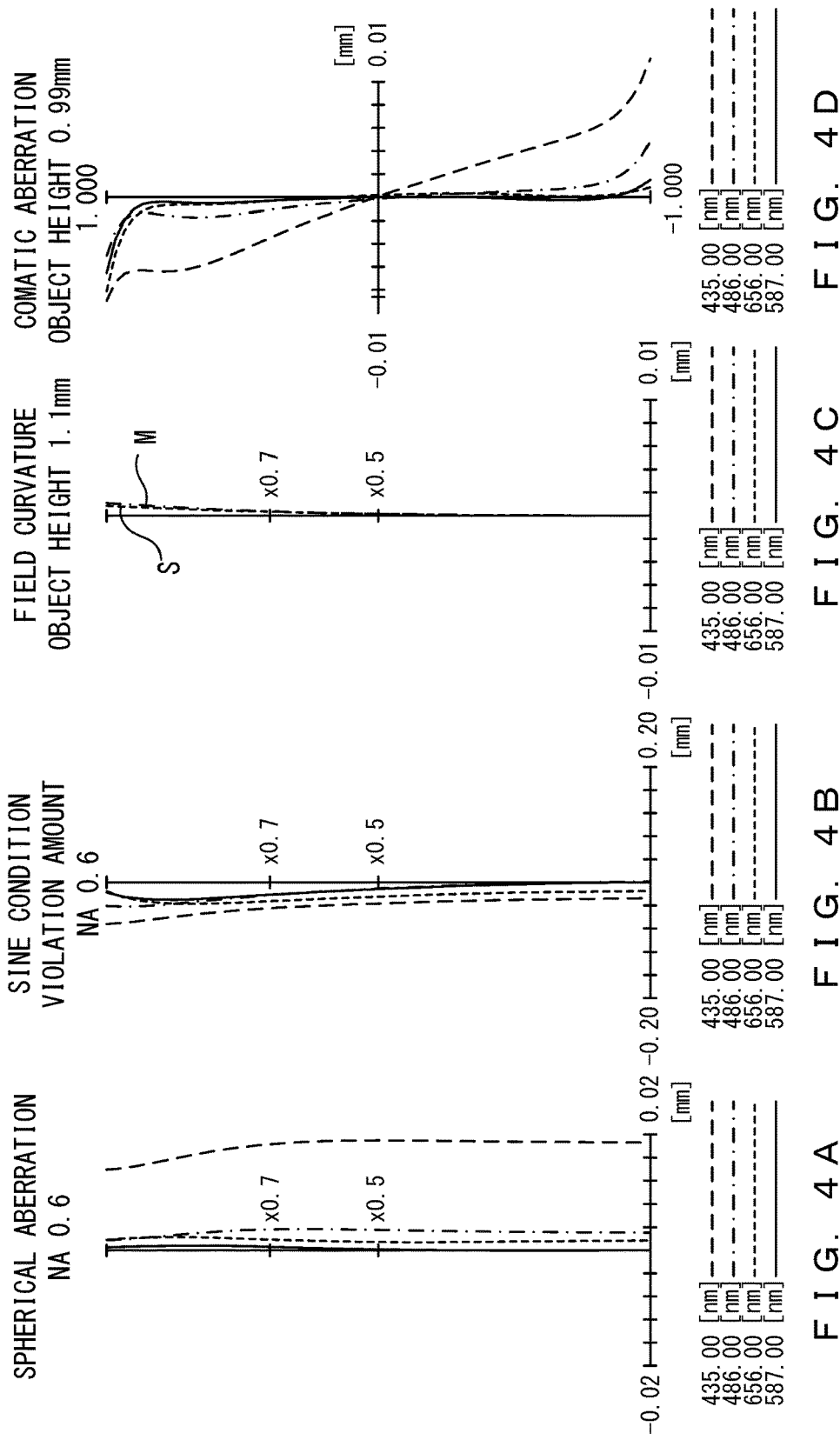
FIG. 4A through FIG. 4D are aberration diagrams of the microscope objective 2.

FIG. 3 is a sectional view of a microscope objective 2 according to the present example. The microscope objective 2 is an immersion objective. The microscope objective 2 includes first lens group G1, with a positive refractive power, that converts divergent light from an object point into convergent light and second lens group G2, with a negative refractive power, that is arranged closer to the image than is first lens group G1. The space between the object plane and first lens group G1 is filled with immersion liquid IM.

First lens group G1 includes a plano-convex lens component (lens L1) having a plano-convex shape and having the planar surface on the object side. The plano-convex lens component is a front-end lens component arranged closest to the object in the first lens group G1.

In more detail, first lens group G1 includes, in order starting from the object side, plano-convex lens L1 (front-end lens component) having the planar surface on the object side and cemented lens CL1 having biconvex shape. Cemented lens CL1 includes biconvex lens L2 and meniscus lens L3 having the concave surface on the object side.

Second lens group G2 includes a first meniscus lens component (cemented lens CL4) having the concave surface on the image side and a second meniscus lens component (cemented lens CL5) arranged closer to the image than is the first meniscus lens component and having the concave surface on the object side. Second lens group G2 further includes a third lens component (lens L11), with a negative refractive power, that is arranged between the first and second meniscus lens components.

In more detail, second lens group G2 includes, in order starting from the object side, three-piece cemented lens CL2 having a biconvex shape, a cemented lens CL3 having a biconvex shape, a cemented lens CL4 having the concave surface on the image side and having a meniscus shape, biconcave lens L11 and a cemented lens CL5 having the concave surface on the object side and having a meniscus shape. Three-piece cemented lens CL2 includes meniscus lens L4 having the concave surface on the image side, biconvex lens L5 and meniscus lens L6 having the concave surface on the object side. Cemented lens CL3 includes biconvex lens L7 and meniscus lens L8 having the concave surface on the object side. Cemented lens CL4 includes a meniscus lens L9 having the concave surface on the image side and meniscus lens L10 having the concave surface on the image side. Cemented lens CL5 includes meniscus lens L12 having the concave surface on the object side and meniscus lens L13 having the concave surface on the object side.

The microscope objective 2 has lens data as below.

| Microscope objective 2 | | | | |
|---|---|---|---|---|
| s | r | d | nd | vd |
| 1 (object plane) | INF | 19.999 | 1.55003 | 49.50 |
| 2 | INF | 11.094 | 1.88306 | 40.76 |
| 3 | −25.6332 | 0.500 | 1.00000 | |
| 4 | 228.1039 | 7.571 | 1.56910 | 71.30 |
| 5 | −16.9651 | 3.750 | 1.65103 | 56.16 |
| 6 | −30.8376 | 0.300 | 1.00000 | |
| 7 | 141.2410 | 3.500 | 1.63779 | 42.41 |
| 8 | 19.8226 | 12.352 | 1.43876 | 94.93 |
| 9 | −19.4710 | 3.400 | 1.63779 | 42.41 |
| 10 | −389.9028 | 0.300 | 1.00000 | |
| 11 | 40.9618 | 10.971 | 1.49702 | 81.54 |
| 12 | −21.1002 | 3.650 | 1.63779 | 42.41 |
| 13 | −30.3231 | 0.625 | 1.00000 | |
| 14 | 21.5308 | 9.425 | 1.88306 | 40.76 |
| 15 | 36.2759 | 2.300 | 1.73806 | 32.26 |
| 16 | 12.3661 | 6.441 | 1.00000 | |
| 17 | −13.5162 | 2.000 | 1.43876 | 94.93 |
| 18 | 51.2154 | 3.365 | 1.00000 | |
| 19 | −17.8327 | 5.979 | 1.58916 | 61.14 |
| 20 | −52.8145 | 7.796 | 1.88306 | 40.76 |
| 21 | −23.2874 | | | |

The microscope objective 2 has data as below.
NA=0.6, f=17.983 mm, WD=19.999 mm, Y=1.1 mm, $f_{G1}$=20.652 mm, $f_{G2}$=−382.618 mm, D=115.318 mm, $D_{G2}$=72.104 mm, $D_{GL}$=13.775 mm, $D_{GM}$=2 mm, $f_{GM}$=−24.145 mm, $f_{U1}$=29.028 mm The microscope objective 2 satisfies conditional expressions (1) through (6) as described below.

$$WD/D = 0.173 \tag{1}$$

$$D_{G2}/WD = 3.605 \tag{2}$$

$$D_{GL}/f = 0.766 \tag{3}$$

$D_{GL}/D_{GM}=6.888$ (4)

$D_{GM}/f_{GM}=-0.083$ (5)

$f_{U1}/WD=1.451$ (6)

FIG. 4A through FIG. 4D are aberration diagrams of the microscope objective 2. As shown in FIG. 4A through FIG. 4D, in the microscope objective 2, aberrations are corrected excellently over a wide field of view and high imaging performance is realized.

Example 3

Figure 5:
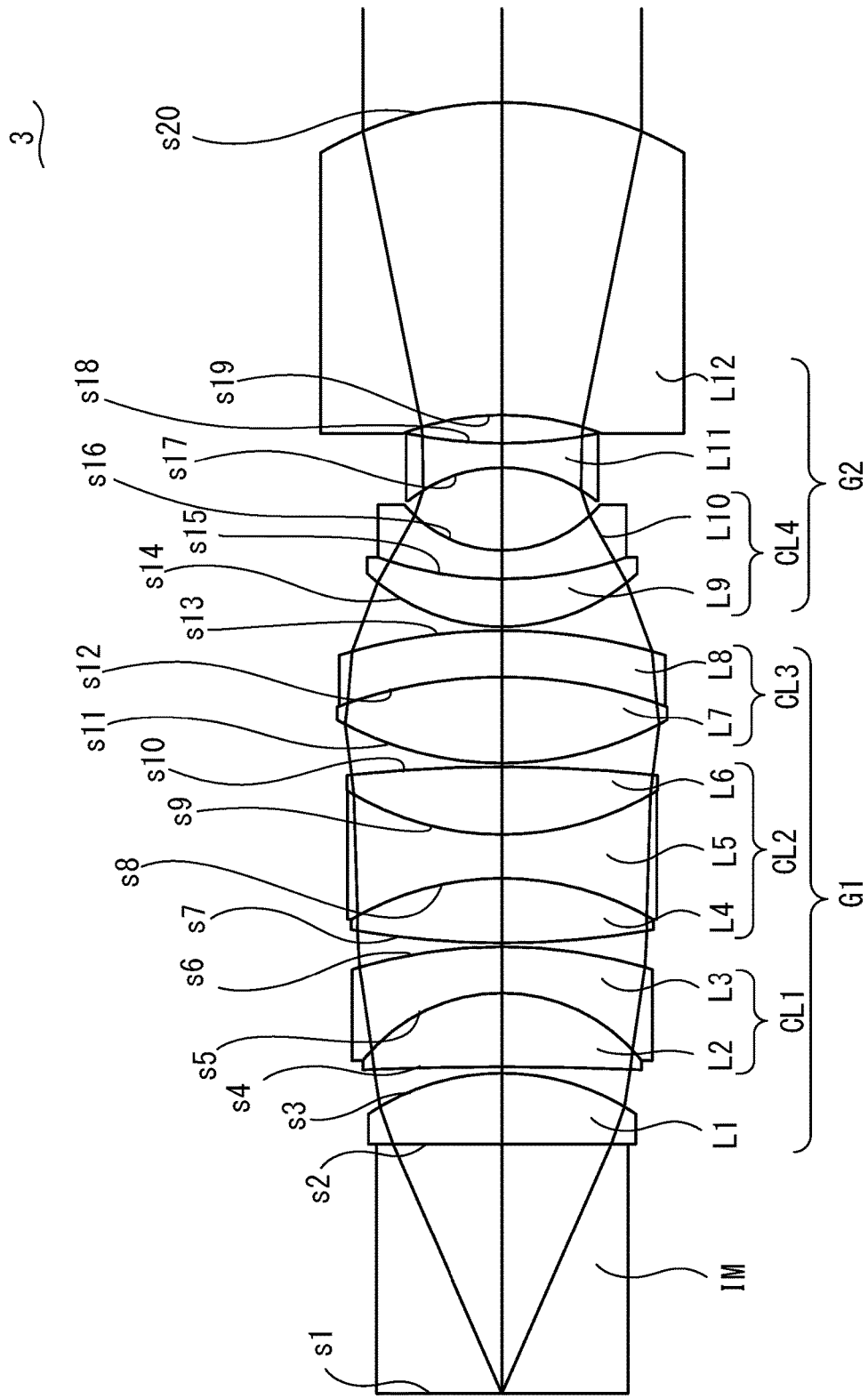
FIG. 5 is a sectional view of a microscope objective 3 according to example 3.
Figure 6:
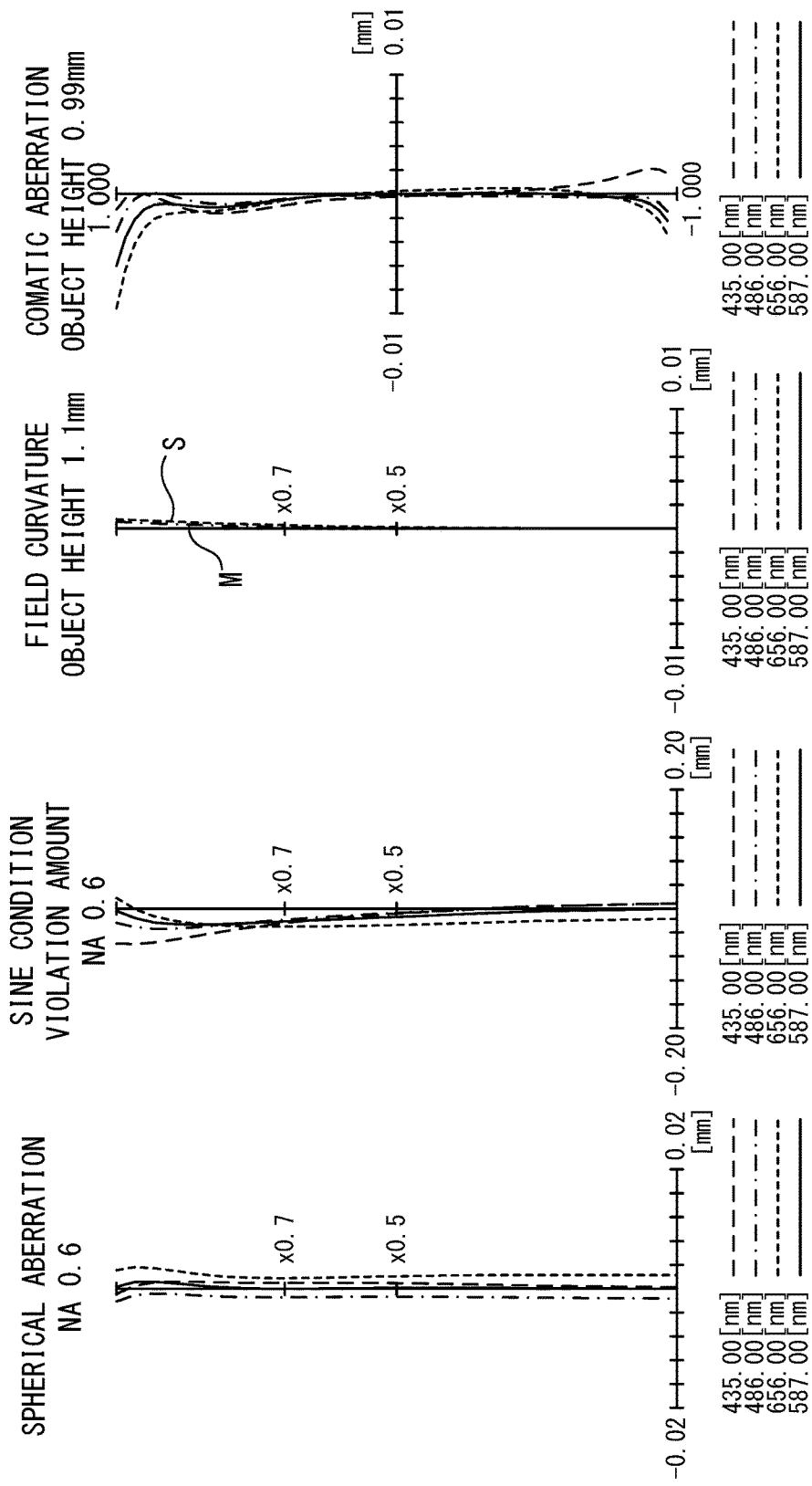
FIG. 6A through FIG. 6D are aberration diagrams of the microscope objective 3.

FIG. 5 is a sectional view of a microscope objective 3 according to the present example. The microscope objective 3 is an immersion objective. The microscope objective 3 includes first lens group G1, with a positive refractive power, that converts divergent light from an object point into convergent light and second lens group G2, with a negative refractive power, that is arranged closer to the image than is first lens group G1. The space between the object plane and first lens group G1 is filled with immersion liquid IM.

First lens group G1 includes a plano-convex lens component (lens L1) having a plano-convex shape and having the planar surface on the object side. The plano-convex lens component is a front-end lens component arranged closest to the object in the first lens group G1.

In more detail, first lens group G1 includes, in order starting from the object side, plano-convex lens L1 (front-end lens component) having the planar surface on the object side, cemented lens CL1 having the concave surface on the object side and a meniscus shape, three-piece cemented lens CL2 having a biconvex shape and cemented lens CL3 having a biconvex shape. Cemented lens CL1 includes meniscus lens L2 having the concave surface on the object side and meniscus lens L3 having the concave surface on the object side. Three-piece cemented lens CL2 includes biconvex lens L4, biconcave lens L5 and biconvex lens L6. Cemented lens CL3 includes biconvex lens L7 and meniscus lens L8 having the concave surface on the object side.

Second lens group G2 includes a first meniscus lens component (cemented lens CL4) having the concave surface on the image side and a second meniscus lens component (lens L12) arranged closer to the image than is the first meniscus lens component and having the concave surface on the object side. Second lens group G2 further includes a third lens component (lens L11), with a negative refractive power, that is arranged between the first and second meniscus lens components.

In more detail, second lens group G2 includes, in order starting from the object side, cemented lens CL4 having the concave surface on the image side and having a meniscus shape, biconcave lens L11 and meniscus lens L12 having the concave surface on the object side. Cemented lens CL4 includes meniscus lens L9 having the concave surface on the image side and meniscus lens L10 having the concave surface on the image side.

The microscope objective 3 has lens data as below.

| Microscope objective 3 | | | | |
|---|---|---|---|---|
| s | r | d | nd | vd |
| 1 (object plane) | INF | 20.000 | 1.55000 | 49.50 |
| 2 | INF | 5.701 | 1.88300 | 40.76 |
| 3 | −19.2098 | 0.500 | | |

-continued

| Microscope objective 3 | | | | |
|---|---|---|---|---|
| s | r | d | nd | vd |
| 4 | −271.2603 | 5.916 | 1.56907 | 71.30 |
| 5 | −14.2275 | 3.750 | 1.63775 | 42.41 |
| 6 | −40.4770 | 0.300 | | |
| 7 | 69.1963 | 5.173 | 1.49700 | 81.54 |
| 8 | −23.8246 | 3.500 | 1.63775 | 42.41 |
| 9 | 23.6530 | 5.417 | 1.43875 | 94.93 |
| 10 | −115.6453 | 0.300 | | |
| 11 | 26.9399 | 6.945 | 1.56907 | 71.30 |
| 12 | −37.5691 | 3.721 | 1.63775 | 42.41 |
| 13 | −43.9177 | 0.300 | | |
| 14 | 15.8420 | 3.810 | 1.80400 | 46.58 |
| 15 | 29.0327 | 2.300 | 1.73800 | 32.26 |
| 16 | 10.2741 | 6.627 | | |
| 17 | −11.9898 | 2.000 | 1.48749 | 70.23 |
| 18 | 37.7630 | 2.266 | | |
| 19 | −22.0945 | 25.052 | 1.88300 | 40.76 |
| 20 | −28.1744 | | | |

The microscope objective 3 has data as below.
NA=0.6, f=17.997 mm, WD=20 mm, Y=1.1 mm, $f_{G1}$=19.072 mm, $f_{G2}$=−38.416 mm, D=103.578 mm, $D_{G2}$=42.055 mm, $D_{GL}$=25.052 mm, $D_{GM}$=2 mm, $f_{GM}$=−18.425 mm, $f_{U1}$=21.755 mm The microscope objective 3 satisfies conditional expressions (1) through (6) as described below.

WD/D=0.193 (1)

$D_{G2}/WD=2.103$ (2)

$D_{GL}/f=1.392$ (3)

$D_{GL}/D_{GM}=12.526$ (4)

$D_{GM}/f_{GM}=-0.109$ (5)

$f_{U1}/WD=1.088$ (6)

FIG. 6A through FIG. 6D are aberration diagrams of the microscope objective 3. As shown in FIG. 6A through FIG. 6D, in the microscope objective 3, aberrations are corrected excellently over a wide field of view and high imaging performance is realized.

Example 4

FIG. 7 is a sectional view of a microscope objective 4 according to the present example. The microscope objective 4 is an immersion objective including a movable lens component (cemented lens CL3) that moves along the optical axis. The microscope objective 4 includes first lens group G1, with a positive refractive power, that converts divergent light from an object point into convergent light and second lens group G2, with a negative refractive power, that is arranged closer to the image than is first lens group G1. The space between the object plane and first lens group G1 is filled with immersion liquid IM.

First lens group G1 includes a plano-convex lens component (cemented lens CL1) having a plano-convex shape and having the planar surface on the object side. The plano-convex lens component is a front-end lens component arranged closest to the object in the first lens group G1.

In more detail, first lens group G1 includes, in order starting from the object side, cemented lens CL1 (front-end lens component) having the planar surface on the object side and having a plano-convex shape, plano-convex lens L3 having the planar surface on the object side and cemented lens CL2 having a biconvex shape. Cemented lens CL1 includes plano-convex lens L1 having the planar surface on the object side and meniscus lens L2 having the concave surface on the object side. Cemented lens CL2 includes meniscus lens L4 having the concave surface on the image side and biconvex lens L5.

Second lens group G2 includes a first meniscus lens component (cemented lens CL5) having the concave surface on the image side and a second meniscus lens component (lens L15) arranged closer to the image than is the first meniscus lens component and having the concave surface on the object side. Second lens group G2 further includes a third lens component (lens L13), with a negative refractive power, that is arranged between the first and second meniscus lens components. Second lens group G2 further includes a movable lens component (three-piece cemented lens CL3) that moves along the optical axis, and the movable lens component has a negative refractive power.

In more detail, second lens group G2 includes, in order starting from the object side, three-piece cemented lens CL3 having the planar surface on the object side and having a plano-concave shape, cemented lens CL4 having a biconvex shape, cemented lens CL5 having the concave surface on the image side and having a meniscus shape, meniscus lens L13 having the concave surface on the object side, plano-concave lens L14 having the concave surface on the object side and meniscus lens L15 having the concave surface on the object side. Three-piece cemented lens CL3 is a movable lens component including plano-concave lens L6 having the concave surface on the image side, biconvex lens L7 and biconcave lens L8. Cemented lens CL4 includes biconvex lens L9 and meniscus lens L10 having the concave surface on the object side. Cemented lens CL5 includes meniscus lens L11 having the concave surface on the image side and meniscus lens L12 having the concave surface on the image side.

The microscope objective 4 has lens data as below.

| Microscope objective 4 | | | | |
|---|---|---|---|---|
| s | r | d | nd | vd |
| 1 (object plane) | INF | D1 | ND1 | vD1 |
| 2 | INF | 2.411 | 1.51635 | 64.14 |
| 3 | −33.7737 | 12.968 | 1.88306 | 40.76 |
| 4 | −27.7951 | 0.814 | | |
| 5 | INF | 11.734 | 1.49702 | 81.54 |
| 6 | −41.3695 | 0.500 | | |
| 7 | 35.9534 | 3.750 | 1.83486 | 42.73 |
| 8 | 26.7067 | 8.189 | 1.49702 | 81.54 |
| 9 | −157.8595 | D9 | | |
| 10 | INF | 3.500 | 1.63779 | 42.41 |
| 11 | 28.6522 | 9.544 | 1.43876 | 94.93 |
| 12 | −29.0496 | 3.400 | 1.63779 | 42.41 |
| 13 | 163.0789 | D13 | | |
| 14 | 27.5002 | 9.000 | 1.49702 | 81.54 |
| 15 | −50.2152 | 3.704 | 1.63779 | 42.41 |
| 16 | −95.6275 | 0.614 | | |
| 17 | 21.2645 | 3.868 | 1.88306 | 40.76 |
| 18 | 33.2199 | 2.304 | 1.63779 | 42.41 |
| 19 | 14.2249 | 12.189 | | |
| 20 | −16.3101 | 2.000 | 1.43876 | 94.93 |
| 21 | −90.3851 | 3.918 | | |
| 22 | −14.0878 | 2.518 | 1.51635 | 64.14 |
| 23 | INF | 3.545 | | |
| 24 | −60.0894 | 10.724 | 1.88306 | 40.76 |
| 25 | −26.1906 | | | |

Values D1, D9 and D13 of inter-surface distances d1, d9, and d13 respectively of a state where immersion liquid IM1 with ND1=1.45003 and vD1=40.60 is used (which will be referred to as a first state hereinafter), a state where immersion liquid IM2 with ND1=1.42800 and vD1=39.70 is used (which will be referred to as a second state hereinafter) and a state where immersion liquid IM3 with ND1=1.51100 and vD1=40.10 is used are as below, where ND1 and vD1 are the value of the refractive index of an immersion liquid and the value of an Abbe number, respectively.

| | first state | second state | third state |
|---|---|---|---|
| D1 | 19.909 | 19.673 | 20.547 |
| D9 | 1.000 | 0.200 | 3.319 |
| D13 | 2.519 | 3.319 | 0.200 |

Data that is not dependent on the states from among pieces of data of the microscope objective 4 is as below.
NA=0.6, Y=1.1 mm, $f_{G1}$=21.829 mm, $D_{GL}$=10.724 mm, $D_{GM}$=2 mm, $f_{GM}$=−45.734 mm, $f_{U1}$=42.94 mm Data dependent on the states from among pieces of data of the microscope objective 4 is as below.
First State
  f=18.141 mm, WD=19.909 mm, $f_{G2}$=−65.137 mm, D=134.622 mm, $D_{G2}$=73.347 mm
Second State
  f=18.415 mm, WD=19.673 mm, $f_{G2}$=−65.619 mm, D=134.386 mm, $D_{G2}$=74.147 mm
Third State
  f=17.375 mm, WD=20.547 mm, $f_{G2}$=−63.781 mm, D=135.26 mm, $D_{G2}$=71.028 mm The microscope objective 4 satisfies conditional expressions (1) through (6) as described below.

$WD/D$=0.148 (first state)

$WD/D$=0.146 (second state)

$WD/D$=0.152 (third state)   (1)

$D_{G2}/WD$=3.684 (first state)

$D_{G2}/WD$=3.769 (second state)

$D_{G2}/WD$=3.457 (third state)   (2)

$D_{GL}/f$=0.591 (first state)

$D_{GL}/f$=0.582 (second state)

$D_{GL}/f$=0.617 (third state)   (3)

$D_{GL}/D_{GM}$=5.362   (4)

$D_{GM}/f_{GM}$=−0.044   (5)

$f_{U1}/WD$=2.157 (first state)

$f_{U1}/WD$=2.183 (second state)

$f_{U1}/WD$=2.090 (third state)   (6)

FIG. 8A through FIG. 8D, FIG. 9A through FIG. 9D and FIG. 10A through FIG. 10D are aberration diagrams of the microscope objective 4 in the first through third states, respectively. As shown in FIG. 8A through FIG. 10D, in the microscope objective 4, aberrations are corrected excellently over a wide field of view, realizing high imaging performance.

What is claimed is:

1. An immersion objective comprising:
a first lens group, with a positive refractive power, that converts divergent light from an object point into convergent light; and
a second lens group, with a negative refractive power, that is arranged closer to an image than is the first lens group, wherein
the immersion objective satisfies $$0.11 \leq WD/D \leq 0.7 \tag{1}$$

where WD is a working distance of the immersion objective and D is a distance on an optical axis of the immersion objective from an observation target plane to a lens surface closest to the image in the immersion objective.

2. The immersion objective according to claim 1, wherein the immersion objective satisfies $$0.7 \leq D_{G2}/WD \leq 5 \tag{2}$$

wherein $D_{G2}$ is a distance on the optical axis from a lens surface closest to an object in the second lens group to a lens surface closest to the image in the second lens group.

3. The immersion objective according to claim 1, wherein the second lens group includes:
a first meniscus lens component having a concave surface on an image side; and
a second meniscus lens component arranged closer to the image than is the first meniscus lens component and having a concave surface on an object side.

4. The immersion objective according to claim 3, wherein the immersion objective satisfies $$0.46 \leq D_{GL}/f \leq 3 \tag{3}$$

where $D_{GL}$ is a distance on the optical axis from a lens surface closest to an object in the second meniscus lens component to a lens surface closest to the image in the second meniscus lens component and f is a focal length of the immersion objective.

5. The immersion objective according to claim 3, wherein the second lens group further includes a third lens component, with a negative refractive power, that is arranged between the first and second meniscus lens components.

6. The immersion objective according to claim 5, wherein the immersion objective satisfies $$2 \leq D_{GL}/D_{GM} \leq 40 \tag{4}$$

where $D_{GL}$ is a distance on the optical axis from a lens surface closest to an object in the second meniscus lens component to a lens surface closest to the image in the second meniscus lens component and $D_{GM}$ is a distance on the optical axis from a lens surface closest to the object in the third lens component to a lens surface closest to the image in the third lens component.

7. The immersion objective according to claim 5, wherein the immersion objective satisfies $$-0.15 \leq D_{GM}/f_{GM} \leq -0.01 \tag{5}$$

where $D_{GM}$ is a distance on the optical axis from a lens surface closest to an object in the third lens component to a lens surface closest to the image in the third lens component and $f_{GM}$ is a focal length of the third lens component.

8. The immersion objective according to claim 1, comprising
a movable lens component that moves along the optical axis.

9. The immersion objective according to claim 8, wherein the movable lens component has a negative refractive power.

10. The immersion objective according to claim 8, wherein the movable lens component is a cemented lens.

11. The immersion objective according to claim 1, wherein
the first lens group includes a plano-convex lens component having a planar surface on an object side and having a plano-convex shape, and
the plano-convex lens component is a front-end lens component arranged closest to an object in the first lens group.

12. The immersion objective according to claim 11, wherein
the immersion objective satisfies $$0.3 \leq f_{U1}/WD \leq 4 \tag{6}$$

where $f_{U1}$ is a focal length of the front-end lens component.

13. The immersion objective according to claim 2, wherein
the second lens group includes:
a first meniscus lens component having a concave surface on an image side; and
a second meniscus lens component arranged closer to the image than is the first meniscus lens component and having a concave surface on an object side.

14. The immersion objective according to claim 13, wherein
the immersion objective satisfies $$0.46 \leq D_{GL}/f \leq 3 \tag{3}$$

where $D_{GL}$ is a distance on the optical axis from a lens surface closest to an object in the second meniscus lens component to a lens surface closest to the image in the second meniscus lens component and f is a focal length of the immersion objective.

15. The immersion objective according to claim 13, wherein
the second lens group further includes a third lens component, with a negative refractive power, that is arranged between the first and second meniscus lens components.

16. The immersion objective according to claim 15, wherein
the immersion objective satisfies $$2 \leq D_{GL}/D_{GM} \leq 40 \tag{4}$$

where $D_{GL}$ is a distance on the optical axis from a lens surface closest to an object in the second meniscus lens component to a lens surface closest to the image in the second meniscus lens component and $D_{GM}$ is a distance on the optical axis from a lens surface closest to the object in the third lens component to a lens surface closest to the image in the third lens component.

17. The immersion objective according to claim 2, comprising
a movable lens component that moves along the optical axis.

18. The immersion objective according to claim 17, wherein
the movable lens component has a negative refractive power.

19. The immersion objective according to claim 18, wherein
the second lens group includes:
a first meniscus lens component having a concave surface on an image side; and
a second meniscus lens component arranged closer to the image than is the first meniscus lens component and having a concave surface on an object side.

20. The immersion objective according to claim 19, wherein
the second lens group further includes a third lens component, with a negative refractive power, that is arranged between the first and second meniscus lens components.

* * * * *